(12) United States Patent
Nitta

(10) Patent No.: US 9,374,481 B2
(45) Date of Patent: Jun. 21, 2016

(54) IMAGE PROCESSING APPARATUS

(71) Applicant: KYOCERA Document Solutions Inc., Osaka (JP)

(72) Inventor: Ryuichi Nitta, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/796,562

(22) Filed: Jul. 10, 2015

(65) Prior Publication Data

US 2016/0028904 A1 Jan. 28, 2016

(30) Foreign Application Priority Data

Jul. 28, 2014 (JP) .................. 2014-152746

(51) Int. Cl.
*H04N 1/04* (2006.01)
*H04N 1/00* (2006.01)

(52) U.S. Cl.
CPC .................. *H04N 1/00352* (2013.01)

(58) Field of Classification Search
CPC .......... H04N 21/4223; H04N 5/23206; H04N 21/4882; H04N 21/6582; H04N 2201/0094; H04N 5/23296; H04N 21/4126; H04N 2201/0081; H04N 7/147; G06F 3/017; G06F 3/011; G06F 9/45558; G06F 21/602; G06F 3/04
USPC ................ 358/1.15, 1.14; 709/203, 202, 217; 382/103, 118; 707/736, 771, 781
See application file for complete search history.

(56) References Cited

U.S. PATENT DOCUMENTS

| | | | | |
|---|---|---|---|---|
| 2001/0042681 A1* | 11/2001 | Yoon | ............... | H01H 13/70 200/517 |
| 2003/0120369 A1* | 6/2003 | Takaoka | ............... | G06Q 10/06 700/95 |
| 2007/0168413 A1* | 7/2007 | Barletta | ............... | G06F 3/04883 709/203 |
| 2008/0239329 A1* | 10/2008 | Kitada | ............... | H04N 1/00244 358/1.1 |
| 2010/0114951 A1* | 5/2010 | Bauman | ............... | G06F 19/321 707/770 |
| 2010/0165083 A1* | 7/2010 | Sasaki | ............... | G11B 20/10527 348/51 |
| 2011/0113097 A1* | 5/2011 | Takeuchi | ............... | H04N 1/00183 709/204 |
| 2011/0125806 A1* | 5/2011 | Park | ............... | G06F 21/6218 707/803 |
| 2012/0246114 A1* | 9/2012 | Edmiston | ............... | G06T 11/60 707/625 |
| 2013/0038899 A1* | 2/2013 | Seikh | ............... | G06F 3/1204 358/1.15 |
| 2014/0331164 A1* | 11/2014 | Enomoto | ............... | H04N 1/00307 715/771 |
| 2015/0043021 A1* | 2/2015 | Ikeda | ............... | H04N 1/32561 358/1.13 |

FOREIGN PATENT DOCUMENTS

JP 2005-074690 A 3/2005

* cited by examiner

*Primary Examiner* — Negussie Worku
(74) *Attorney, Agent, or Firm* — Studebaker & Brackett PC

(57) ABSTRACT

An image processing apparatus includes a first storing part, a storage controlling part and a display controlling part. The storage controlling part stores, when a first remote operation device carries out an image output operation making the image processing apparatus process an output object image on a first process condition of the first remote operation device to create a first processed image and output the first processed image, the output object image in the first storing part with associating with the first process condition. The display controlling part processes, when a second remote operation device carries out a preview operation displaying the output object image stored in the first storing part, the output object image on a second process condition of the second remote operation device to create a second processed image and makes the second remote operation device display the second processed image on a displaying part.

5 Claims, 10 Drawing Sheets

FIG. 5

| OUTPUT OBJECT IMAGE FILE NAME | IMAGE DATA OF OUTPUT OBJECT IMAGE | FIRST PROCESS CONDITION | ID OF REMOTE OPERATION DEVICE |
|---|---|---|---|
| Image1.bmp | BINARY DATA | THICKENING, FULL COLOR | xxx.xxx.xxx.xx1 |
| Image2.bmp | BINARY DATA | NORMAL, FULL COLOR | xxx.xxx.xxx.xx2 |
| Image3.bmp | BINARY DATA | THINNING, MONOCHROME | xxx.xxx.xxx.xx3 |
| Image4.bmp | BINARY DATA | THICKENING, GRAY SCALE | xxx.xxx.xxx.xx4 |

FIG. 8

| ID OF REMOTE OPERATION DEVICE | ID OF GROUP |
|---|---|
| xxx.xxx.xxx.xx1 | G1 |
| xxx.xxx.xxx.xx2 | G1 |
| xxx.xxx.xxx.xx3 | G2 |

IMAGE PROCESSING APPARATUS

INCORPORATION BY REFERENCE

This application is based on and claims the benefit of priority from Japanese Patent application No. 2014-152746 filed on Jul. 28, 2014, the entire contents of which are incorporated herein by reference.

BACKGROUND

The present disclosure relates to an image processing apparatus operated by a plurality of remote operation devices, particularly, a technique previewing processed image outputted in the past on the remote operation device.

Conventionally, an image processing apparatus, such as a multifunction peripheral, a printer and a scanner, operatable by using a remote operation device, such as a smart phone and a tablet terminal, is known. Concretely, in order to make the image processing apparatus output an image, e.g. print the image or create an electronic file of image data representing the image and output the electronic file, operation mentioned later is carried out in the remote operation device.

At first, operation making the image processing apparatus obtain an image of an output object (an output object image), such as operation instructing a scanner provided in the image processing apparatus to read image of a document or operation transmitting the image stored in the remote operation device to the image processing apparatus, is carried out. Subsequently, operation setting a process condition in processing the output object image, such as a condition whether concentration of the output object image is thickened or thinned or a condition whether the output object image is outputted in color or in monochrome, is carried out. Thereby, the image processing apparatus processes the output object image in the set process condition to create a processed image and outputs the processed image.

Moreover, for example, an image forming apparatus displaying selectably an image name applied to the image data outputted in the past and being capable of printing the image data corresponding to the selected image name and previewing the image represented by the image data corresponding to the selected image name is known.

An image processing apparatus using these conventional techniques is known to preview the processed image outputted in the past on the remote operation device and to re-print the processed image by operating the remote operation device after making a user of the remote operation device visually recognize the processed image.

However, the processed image previewed in the remote operation device by the image processing apparatus using the above-mentioned techniques is one processed image processed on one process condition set by one remote operation device of one user in the past. Therefore, another user of another remote operation device cannot visually recognize an image re-processed on another process condition different from the one process condition used when the one processed image is processed in the past. That is, another user of another remote operation device cannot re-process and re-use the one processed image outputted from the image processing apparatus by the one user of the one remote operation apparatus different from another remote operation device on another process condition set by another remote operation device.

SUMMARY

In accordance with one aspect of the present disclosure, an image processing apparatus operated by a plurality of remote operation devices includes a first storing part, a storage controlling part and a display controlling part. The storage controlling part is configured, when a first remote operation device out of the plurality of remote operation devices carries out an image output operation making the image processing apparatus process an output object image obtained in the image processing apparatus on a first process condition set by the first remote operation device to create a first processed image and output the first processed image, so as to store the output object image in the first storing part with associating with the first process condition. The display controlling part is configured, when a second remote operation device out of the plurality of remote operation devices carries out a preview operation displaying the output object image stored in the first storing part, so as to process the output object image on a second process condition set peculiar to the second remote operation device to create a second processed image and so as to make the second remote operation device display the second processed image on a displaying part of the second remote operation device.

The above and other objects, features, and advantages of the present disclosure will become more apparent from the following description when taken in conjunction with the accompanying drawings in which a preferred embodiment of the present disclosure is shown by way of illustrative example.

BRIEF DESCRIPTION OF THE DRAWINGS

FIG. 5 is a table showing one example of information stored in a first storing part of the multifunction peripheral.

FIG. 8 is a table showing one example of information stored in a second storing part of the multifunction peripheral.

DETAILED DESCRIPTION

In the following, an embodiment of an image processing apparatus according to the present disclosure will be described with reference to the drawings. Incidentally, in the embodiment, although the image processing apparatus is described with taking a multifunction peripheral as an example, the image processing apparatus is not restricted by this. The image processing apparatus may be, for example, a facsimile device, a copying machine, a scanner or a printer.

Figure 1:
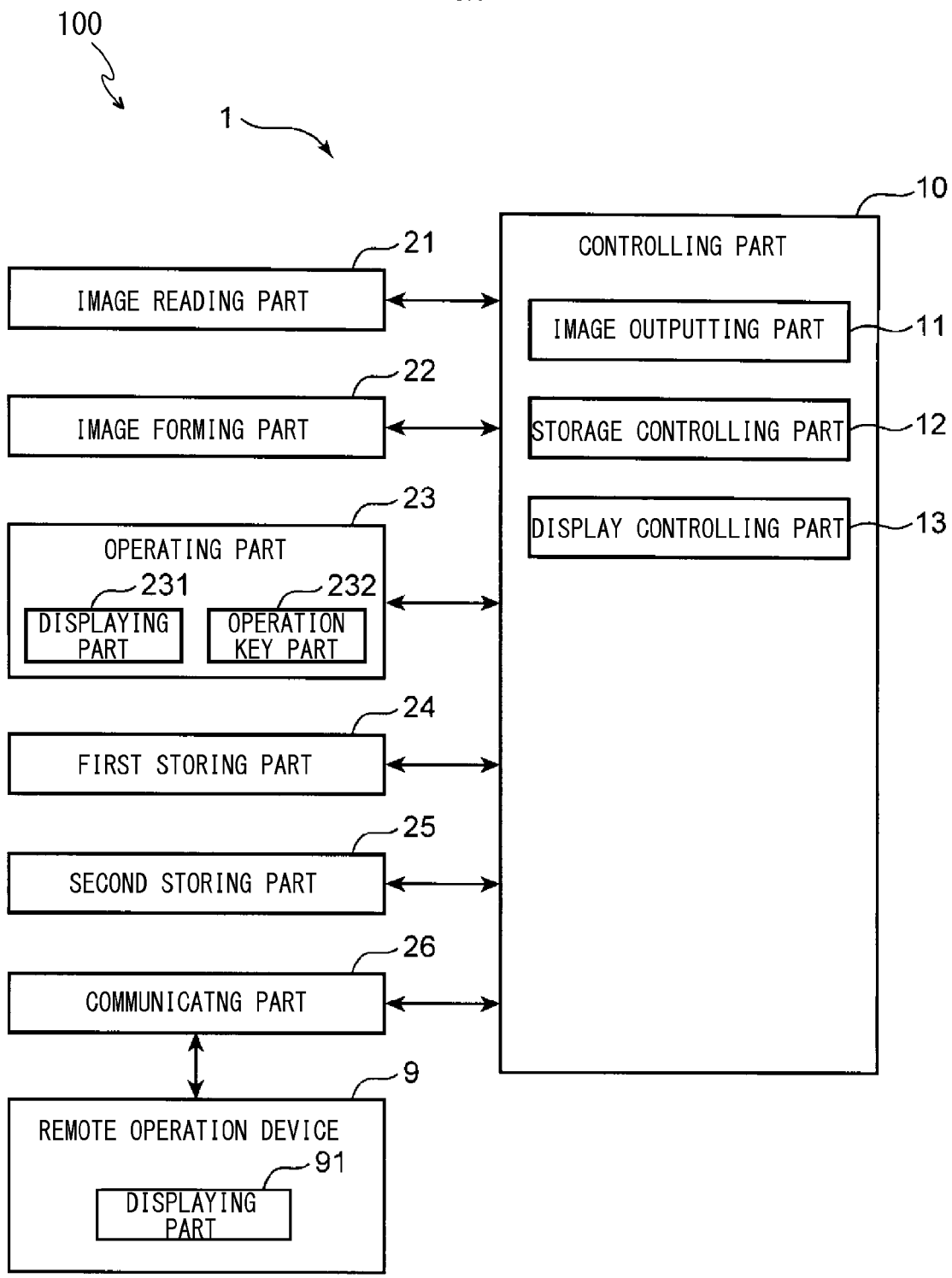
FIG. 1 is a block diagram showing an electrical structure of a multifunction peripheral according to an embodiment of an image processing apparatus in accordance with the present disclosure.

FIG. 1 is a block diagram showing an electrical structure of the multifunction peripheral 1 according to the embodiment of the image processing apparatus in accordance with the present disclosure. As shown in FIG. 1, the multifunction peripheral 1 includes an image reading part 21, an image forming part 22, an operating part 23, a first storing part 24, a second storing part 25, a communicating part 26 and a controlling part 10. The multifunction peripheral 1 is configured so as to be remotely operated by a plurality of remote operation devices 9, such as a smart phone and a tablet terminal.

That is, FIG. 1 shows a remote operation system 100 including one remote operation device 9 in the plurality of remote operation devices 9 and the multifunction peripheral 1 operated remotely by the remote operation device 9.

The image reading part 21 includes an optical unit (not shown) having a CCD (Charged Coupled Device) line sensor and an exposure lump and others. The image reading part 21 is controlled by the controlling part 10 so as to make the optical unit read an image of a document, to create image data representing the image of the document and to output the image data to the controlling part 10.

The image forming part 22 is controlled by the controlling part 10 so as to form a processed image created by the controlling part 10 onto a sheet. Incidentally, to the controlling part 10, the image data created by the above-mentioned image reading part 21, image data received from an external device by the communication part 26 as described later and others are inputted. Moreover, to the controlling part 10, a process condition inputted by the operating part 23, a process condition received from an external device by the communication part 26 as described later and others are inputted. The controlling part 10 processes the inputted image data on the inputted process condition to create the processed image.

Concretely, the image forming part 22 has a known structure including a photosensitive drum, a charging part, an exposing part, a developing part, a cleaning part and others. The charging part is arranged to face to a circumference face of the photosensitive drum. The exposing part is arranged to face to a circumference face of the photosensitive drum at a downstream side of the charging part. The developing part is arranged to face to a circumference face of the photosensitive drum at a downstream side of the exposing part. The cleaning part is arranged to face to a circumference face of the photosensitive drum at a downstream side of the developing part. Because image forming action forming the image on the sheet by the image forming part 22 is known, its description is omitted.

The operating part 23 includes a displaying part 231 displaying information and an operation key part 232 allowing a user to carry out various operation. The displaying part 231 is a liquid crystal display or the like having a touch panel function to display various information. The operation key part 232 includes various keys, for example, numeric keys for inputting numerical values and marks, cursor keys for moving a pointer (a cursor) displayed on the displaying part 231 and others.

The first storing part 24 and the second storing part 25 are storage devices, such as an HDD (Hard Disk Drive) or an SSD (Solid State Drive). The first storing part 24 is controlled by the controlling part 10 to store the image data. In the second storing part 25, identification information identifying each remote operation device 9 and identification information identifying a group to which each remote operation device 9 belongs are stored with being associated with each other. The information stored in the first storing part 24 and the information stored in the second storing part 25 will be described later in detail.

The communicating part 26 is a communication interface circuit used for communication between the remote operation device 9 or an external device (not shown), such as a personal computer, and the controlling part 10 via a LAN (Local Area Network) or the like.

The controlling part 10 controls action of each component of the multifunction peripheral 1. Concretely, the controlling part 10 includes a CPU (Central Processing Unit) (not shown) executing predetermined arithmetic processes, a nonvolatile memory (not shown), such as an EEPROM (Electrically Erasable Programmable Read Only Memory), storing predetermined control programs, a RAM (Random Access Memory) (not shown) storing temporarily data, their peripheral circuits and others.

The controlling part 10 works, for example, as an image outputting part 11, a storage controlling part 12 and a display controlling part 13 by making the CPU execute the control program stored in the nonvolatile memory or the like. The image outputting part 11, the storage controlling part 12 and the display controlling part 13 will be described later in detail.

The remote operation device 9 includes a displaying part 91 composed of a liquid crystal display or the like having a touch panel function. The remote operation device 9 displays an operation screen used for operating the multifunction peripheral 1, a software keyboard used for inputting various information to the operation screen and others on the displaying part 91. Moreover, the remote operation device 9 includes a storage (not shown), such as a nonvolatile memory (e.g. an EEPROM) and a RAM.

That is, a user of the remote operation device 9 touch-operates the operation screen displayed on the displaying part 91 to depress a key on the operation screen and to select a radio button on the operation screen. Moreover, the user of the remote operation device 9 touch-operates the software keyboard displayed on the displaying part 91 to input various information into input columns (a text box) on the operation screen. Thus, the user of the remote operation device 9 uses the operation screen displayed on the displaying part 91 to input a first execution instruction of a first function to be executed in the multifunction peripheral 1.

The remote operation device 9 transmits the first execution instruction of the first function inputted by the user to the controlling part 10 via the communicating part 26. The controlling part 10 executes the first function in accordance with the first execution instruction of the first function received from the remote operation device 9. Thus, the remote operation device 9 remotely operates the multifunction peripheral 1 by transmitting the first execution instruction of the first function inputted by the user to the controlling part 10 via the communicating part 26.

The controlling part 10 executes the first function, and then, replies a second execution instruction of a second function to be executed in the remote operation device 9 in accordance with executed result of the first function to the remote operation device 9 by using the communicating part 26. The remote operation device 9 execute the second function in accordance with the second execution instruction of the second function replied from the multifunction peripheral 1. Thus, the controlling part 10 makes the remote operation device 9 work in accordance with result of remote operation carried out by the remote operation device 9 by replying the second execution instruction of the second function to the remote operation device 9 remotely operating the multifunction peripheral 1 by using the communicating part 26.

In the following, an action of the multifunction peripheral 1 and the remote operation device 9 when image output operation is carried out in the remote operation device 9 will be described. The image output operation is operation making the multifunction peripheral 1 obtain the image of an output object (hereinafter, so-called as an output object image) and making the multifunction peripheral 1 process the obtained output object image on the process condition set by the remote operation device 9 to create the processed image and output the processed image. In this description, the image outputting part 11, the storage controlling part 12 and the display controlling part 13 and information stored in the first storing part 24 will be described in detail.

Firstly, a case where the user of the remote operation device 9 (hereinafter, so-called as a remote user) touch-operates an icon displayed on the displaying part 91 for starting application software remotely operating the multifunction peripheral 1 may be considered. In such a case, the remote operation device 9 displays a menu screen on the displaying part 91. On the menu screen, keys indicating names of various functions executable by the multifunction peripheral 1 are selectably listed and displayed.

Subsequently, if the remote user depresses the key indicating the name of the function outputting the image, such as a printing function and a transmitting function, the remote operation device 9 transmits the name of the touch-operated function to the controlling part 10 via the communicating part 26, and then, displays an image obtaining instruction screen on the displaying part 91. Incidentally, the controlling part 10 stores the name of the received function in the RAM.

The printing function is a function forming the image on the sheet by the image forming part 22 and outputting the sheet with the formed image. The transmitting function is a function creating an electronic file of the image data representing the image and transmitting the electronic file to directed destination.

The image obtaining instruction screen is an operation screen used for carrying out image obtaining instruction operation. The image obtaining instruction operation is operation inputting image obtaining instruction asking the multifunction peripheral 1 to obtain the output object image and transmitting the inputted image obtaining instruction to the controlling part 10 via the communicating part 26.

Figure 2:
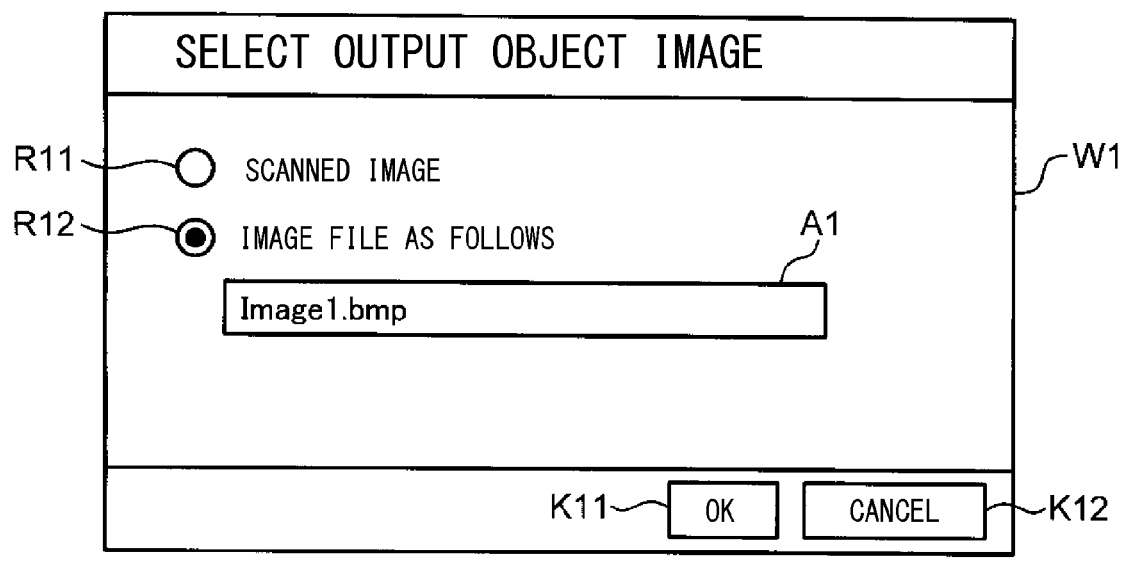
FIG. 2 is a plan view showing one example of an image obtaining instruction screen displayed on a remote operation device.

FIG. 2 is a plan view showing one example of the image obtaining instruction screen W1. For example, as shown in FIG. 2, on the image obtaining instruction screen W1, two radio buttons R11 and R12, a file name input column (a text box) A1 capable of input of an electronic file name, an OK key K11 and a cancel key K12 are arranged.

Two radio buttons R11 and R12 are arranged so that any one of the buttons is selectable. The radio button R11 is arranged so as to be used for inputting a scanned image obtaining instruction. The radio button R12 is arranged so as to be used for inputting a transmitting image obtaining instruction containing the image data composing the electronic file corresponding to the electronic file name inputted in the file name input column A1.

The OK key K11 is arranged so as to conclusively establish inputs of indications according to operation of the radio button R11 or the radio button R12 and the file name input column A1. That is, when, by the remote user, the radio button R11 is selected and the OK key K11 is depressed, the input of the scanned image obtaining instruction is conclusively established. In such a case, the remote operation device 9 transmits the scanned image obtaining instruction to the controlling part 10 via the communicating part 26.

On the other hand, when the radio button R12 is selected, the remote operation device 9 displays the software keyboard on the displaying part 91. Subsequently, the software keyboard may be touch-operated by the remote user so as to input the electronic file name into the file name input column A1, and then, the OK key K11 may be depressed. Then, the input of the transmitting image obtaining instruction containing the image data represented by the electronic file of the electronic file name inputted in the file name input column A1 is conclusively established. In such a case, the remote operation device 9 obtains the image data from the above-mentioned storage (not shown) and transmits the transmitting image obtaining instruction containing the obtained image data to the controlling part 10 via the communicating part 26.

The cancel key K12 is arranged so as to be used for carrying out cancel operation. The cancel operation is operation not displaying (hiding) the operation screen having been displayed on the displaying part 91 (a hided operation screen) and re-displaying a last operation screen having been displayed on the displaying part 91 before the hided operation screen. That is, when the cancel key K12 is depressed, the remote operation device 9 does not display (hides) the image obtaining instruction screen W1 and re-displays the menu screen on the displaying part 91.

Thus, the image obtaining instruction operation is carried out by operation depressing the OK Key K11 after selecting the radio button R11 or operation inputting the electronic file name into the file name input column A1 after selecting the radio button R12, and then, depressing the OK Key K11.

Figure 3:
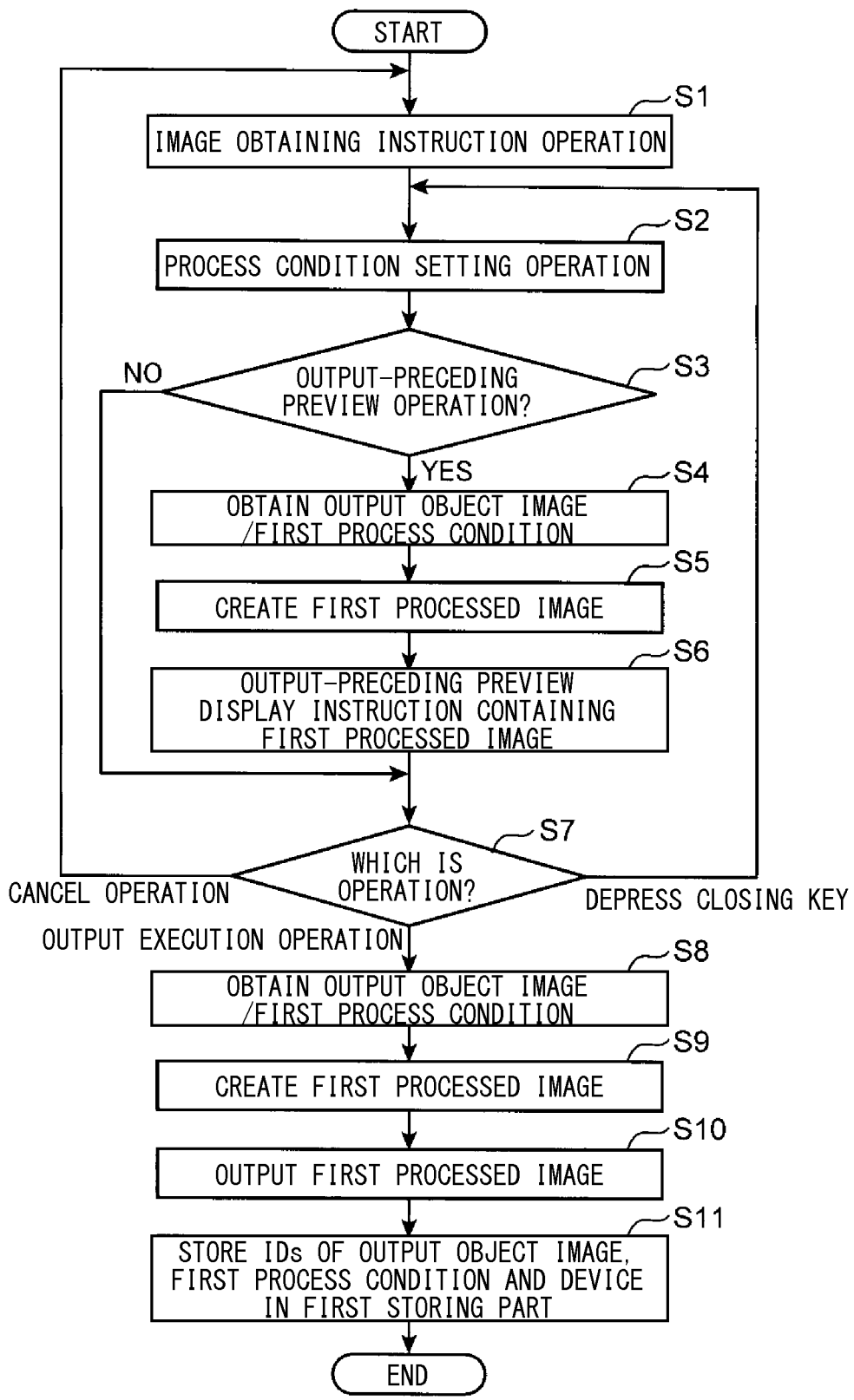
FIG. 3 is a flowchart useful for understanding action of the multifunction peripheral and the remote operation device when image output operation is carried out by the remote operation device.

FIG. 3 is a flowchart useful for understanding action of the multifunction peripheral 1 and the remote operation device 9 when the image output operation is carried out by the remote operation device 9. As shown in FIG. 3, if the image obtaining instruction operation using the image obtaining instruction screen W1 is carried out by the remote user (step S1), the remote operation device 9 transmits the scanned image obtaining instruction and the transmitting image obtaining instruction, and then, displays an image output operation screen on the displaying part 91.

The image output operation screen is configured so as to be capable of output condition setting operation. The output condition setting operation is operation setting an output condition when outputting the output object image to the multifunction peripheral 1. Concretely, the output condition contains a print condition used when outputting the output object image by the printing function, a transmission condition used when outputting the output object image by the transmitting function, the process condition used for processing the output object image when outputting the output object image by the printing function or the transmitting function and other conditions.

For example, the print condition contains a printing number condition designating the number of sheets of objects of image forming, a sheet size condition designating a size of the sheet and other conditions. The transmission condition contains a destination condition designating the destination of the outputted electronic file and other conditions. The process condition contains a concentration adjustment condition adjusting concentration of the image (e.g. "thickening", "normal", "thinning" and others), a color designation condition designating a color of the outputted image (e.g. "full color", "gray scale", "monochrome" and others) and other conditions.

In the following description, in order to simplify the description, a case where the process condition contains two conditions of the concentration adjustment condition and the color designation condition may be considered. Moreover, in the following, in order to simplify the description, in the output condition setting operation using the image output operation screen, operation relating to process condition setting operation as operation setting the process condition will be described in detail.

Figure 4:
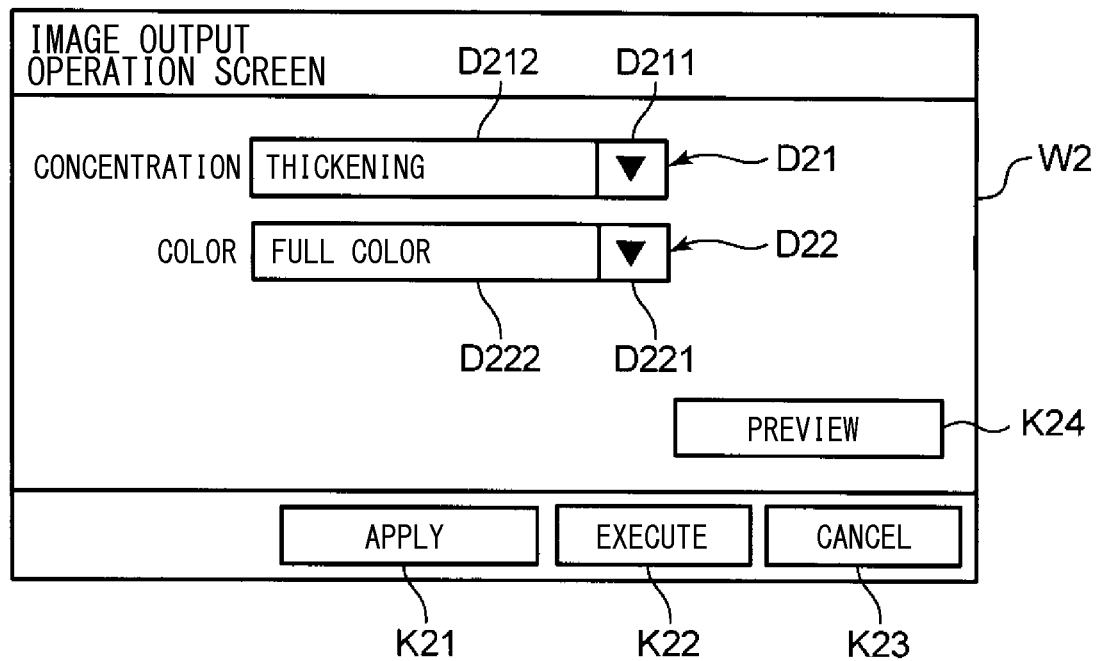
FIG. 4 is a plan view showing one example of an image output operation screen displayed on the remote operation device.

FIG. 4 is a plan view showing one example of the image output operation screen W2. For example, as shown in FIG. 4, in the image output operation screen W2, two dropdown lists D21 and D22, an applying key K21, an executing key K22, a cancel key K23 and a preview key K24 are arranged.

The dropdown list D21 is arranged so as to be used for setting the concentration adjustment condition. Concretely, if a right side key D211 of the dropdown list D21 is touch-operated, a plurality of candidate values (e.g. "thickening", "normal", "thinning" and others) settable as the concentration adjustment condition are displayed selectably. Subsequently, if any one of the displayed plurality of candidate values is selected, the selected candidate value is inputted into an input column D212. Thereby, the concentration adjustment condition is set to the selected candidate value. For example, in a concrete example shown in FIG. 4, the concentration adjustment condition is set to a condition of "thickening".

Incidentally, just after the image obtaining instruction operation is carried out, when displaying the image output operation screen W2 on the displaying part 91, the remote operation device 9 inputs the concentration adjustment condition stored in the storage (not shown) of the remote operation device 9 into the input column D212. That is, at the beginning of displaying of the image output operation screen W2, the concentration adjustment condition is set to the preceding concentration adjustment condition stored in the storage (not shown).

The dropdown list D22 is arranged so as to be used for setting the color designating condition. Concretely, if a right side key D221 of the dropdown list D22 is touch-operated, a plurality of candidate values (e.g. "full color", "gray scale", "monochrome" and others) settable as the color designating condition are displayed selectably. Subsequently, if any one of the displayed plurality of candidate values is selected, the selected candidate value is inputted into an input column D222 of the color designating condition. Thereby, the color designating condition is set to the selected candidate value. For example, in a concrete example shown in FIG. 4, the color designating condition is set to a condition of "full color".

Incidentally, just after the image obtaining instruction operation is carried out, when displaying the image output operation screen W2 on the displaying part 91, the remote operation device 9 inputs the color designating condition stored in the storage (not shown) of the remote operation device 9 into the input column D222. That is, at the beginning of displaying of the image output operation screen W2, the color designating condition is set to the preceding color designating condition stored in the storage (not shown).

Thus, the process condition setting operation is carried out by operation of the dropdown list D21 and the dropdown list D22. Alternatively, the process condition setting operation is carried out by not changing (leaving alone) the preceding process condition peculiar to the remote operation device 9 stored in the storage (not shown) inputted in the input columns D212 and D222 at the beginning of displaying of the image output operation screen W2 without operating the dropdown list D21 and the dropdown list D22.

In the following, the process condition set in the process condition setting operation (in the concrete example, the concentration condition and the color designating condition) is so-called as a first process condition.

The applying key K21 is arranged so as to be used for updating the preceding process condition stored in the storage (not shown). Concretely, if the applying key K21 is depressed, the remote operation device 9 updates the preceding concentration adjustment condition and the preceding color designating condition stored in the storage (not shown) by the concentration adjustment condition inputted into the input column D212 and the color designating condition inputted into the input column D222. Thus, in the storage (not shown) of the remote operation device 9, the process condition peculiar to the remote operation device 9 is stored.

The executing key K22 is arranged so as to be used for carrying out output execution operation. The output execution operation is operation transmitting output execution instruction to the controlling part 10 via the communicating part 26. The output execution instruction is an instruction asking the multifunction peripheral 1 to process the output object image on the first process condition to create the processed image and asking the multifunction peripheral 1 to output the processed image as a first processed image.

That is, if the executing key K22 is depressed, the remote operation device 9 transmits the output execution instruction containing the first process condition to the controlling part 10 via the communicating part 26.

The cancel key K23 is arranged, similarly to the cancel key K12 of the image obtaining instruction screen W1, so as to be used for carrying out cancel operation. That is, if the cancel key K23 is depressed, the remote operation device 9 does not display (hides) the image output operation screen W2 and re-displays the image obtaining instruction screen W1 on the displaying part 91.

The preview key K24 is arranged so as to be used for carrying out output-preceding preview operation. The output-preceding preview operation is operation transmitting an output-preceding preview execution instruction to the controlling part 10 via the communicating part 26. The output-preceding preview execution instruction is an instruction asking the multifunction peripheral 1 to process the output object image on the first process condition to create the first processed image, and then, to reply an output-preceding preview display instruction containing the first processed image after processing. The output-preceding preview display instruction is an instruction asking the remote operation device 9 to display the first processed image contained in the output-preceding preview display instruction on the displaying part 91.

That is, if the preview key K24 is depressed, the remote operation device 9 transmits the output-preceding preview execution instruction containing the first process condition to the controlling part 10 via the communicating part 26. As a result, when the output-preceding preview display instruction containing the first processed image is replied to the remote operation device 9, the remote operation device 9 displays the first processed image on the displaying part 91.

Incidentally, on the image output operation screen W2, a dropdown list (not shown) used for setting the output condition, such as the print condition and the transmission condition, is arranged. That is, similarly to the above-mentioned process condition setting operation, the output condition, such as the print condition and the transmission condition, is set by operation of the dropdown list. When depressing the executing key K22, the remote operation device 9 replies the above-mentioned output execution instruction with containing the output condition, such as the print condition and the transmission condition, set by operation of the dropdown list to the controlling part 10 via the communicating part 26.

With reference to FIG. 3, a case where the image output operation screen W2 is displayed on the displaying part 91 and the process condition setting operation is carried out by the remote user may be considered (step S2). Further, the output-preceding preview operation may be carried out by the remote user (step S3: YES).

In such a case, the display controlling part 13 obtains the output object image in accordance with the image obtaining instruction received when the image obtaining instruction operation is carried out at step S1. The display controlling part 13 obtains the first process condition contained in the output-preceding preview execution instruction received when the output-preceding preview operation is carried out at step S3 (step S4).

At step S4, the display controlling part 13 obtains the output object image in accordance with the image obtaining instruction as follows. In a case where the received image obtaining instruction is the scanned image obtaining instruction, the display controlling part 13 makes the image reading part 21 read the image of the document to obtain the image represented by the image data created by the image reading part 21 as the output object image. On the other hands, in a case where the received image obtaining instruction is the transmitting image obtaining instruction, the display controlling part 13 obtains the image represented by the image data contained in the transmitting image obtaining instruction as the output object image.

Subsequently, the display controlling part 13 processes the output object image obtained at step S4 on the first process condition obtained at step S4 to create the first processed image (step S5).

Further, the display controlling part 13 replies the output-preceding preview display instruction containing the image data representing the first processed image created at step S5 in accordance with the output-preceding preview execution instruction received when the output-preceding preview operation is carried out at step S3 (step S6).

When the remote operation device 9 receives the output-preceding preview display instruction, the remote operation device 9 displays the first processed image represented by the image data contained in the output-preceding preview display instruction on the displaying part 91 so as to overlap the first processed image on the image output operation screen W2. Incidentally, the remote operation device 9 display a closing key used for not displaying (hiding) the first processed image when displaying the first processed image on the displaying part 91.

Then, as a result of visually recognizing the first processed image displayed on the displaying part 91 by the remote user, the remote user may decide that the output object image is not processed intendedly and depresses the closing key displayed together with the first processed image (step S7: DEPRESS CLOSING KEY). In such a case, the action is returned to step S2 and the process condition setting operation using the image output operation screen W2 is carried out by the remote user.

On the other hand, as a result of visually recognizing the first processed image displayed on the displaying part 91 by the remote user, the remote user may decide that the output object image is not processed intendedly and depresses the cancel key K23 to carry out the cancel operation (step S7: CANCEL OPERATION). In such a case, the remote operation device 9 does not display (hides) the image output operation screen W2 and re-displays the image obtaining instruction screen W1 on the displaying part 91. That is, the action is returned to step S1 and the image obtaining instruction operation is carried out by the remote user.

Further, as a result of visually recognizing the first processed image displayed on the displaying part 91 by the remote user, the remote user may decide that the output object image is processed intendedly and depresses the execution key K22 to carry out the output execution operation (step S7: OUTPUT EXECUTION OPERATION). Alternatively, the remote user may not carry out the output-preceding preview operation onto the image output operation screen W2 (step S3: NO) and may depress the execution key K22 to carry out the output execution operation (step S7: OUTPUT EXECUTION OPERATION).

In these cases, the image outputting part 11 obtains, similarly to step S4, the output object image in accordance with the image obtaining instruction received when the image obtaining instruction operation is carried out at step S1. Moreover, the image outputting part 11 obtains the first process condition contained in the output execution instruction received when the output execution operation is carried out at step S7 (step S8).

Subsequently, the image outputting part 11 processes the output object image obtained at step S8 on the first process condition obtained at step S8 to create the first processed image (step S9).

Further, the image outputting part 11 outputs the first processed image (step S10).

Concretely, a case where the name of the function stored in the RAM and touch-operated on the menu screen by the remote user indicates the printing function may be considered. In this case, at step S10, the image outputting part 11 obtains the print condition contained in the output execution instruction received when the output execution operation is carried out at step S7. Moreover, the image outputting part 11 controls the image forming part 22 to form the first processed image on the sheet by using the obtained print condition.

Alternatively, a case where the name of the function stored in the RAM indicates the transmitting function may be considered. In this case, at step S10, the image outputting part 11 obtains the transmission condition contained in the output execution instruction received when the output execution operation is carried out at step S7. Moreover, the image outputting part 11 creates the electronic file based on the image data representing the first processed image and transmits the electronic file to the destination designated by the obtained transmission condition.

When the first processed image is outputted by the image outputting part 11 (step S10), the storage controlling part 12 stores the output object image obtained by the image outputting part 11 at step S8, the first process condition obtained by the image outputting part 11 at step S8 and an identification information of the remote operation device 9 in the first storing part 24 with associating with each other (step S11).

Incidentally, at step S11, the storage controlling part 12 creates an electronic file based on the image data representing the output object image and stores a file name (hereinafter, so-called as an output object image file name) of the electronic file (hereinafter, so-called as an output object image file) and the image data (binary data) representing the output object image of the electronic file in the first storing part 24 with associating with each other, thereby storing the output object image in the first storing part 24.

That is, at step S11, the storage controlling part 12 stores the output object image file name, the image data (binary data) representing the output object image, the first process condition and the identification information of the remote operation device 9 in the first storing part 24 with associating with each other.

The identification information of the remote operation device 9 is information identifying the remote operation device 9, e.g. IP (Internet Protocol) address of transmission source of a data packet which is contained in the data packet indicating each instruction received from the remote operation device 9.

A way of transmitting the identification information is not restricted by the above-mention. The remote operation device 9 may transmit each instruction with containing the identification information of the remote operation device 9, such as a machine name or IP address of the remote operation device 9, when outputting each instruction to the controlling part 10 via the communicating part 26. In such a case, the storage controlling part 12 obtains the identification information contained in the output execution instruction received when the output execution operation is carried out at step S7 and stores the obtained identification information in the first storing part 24 with containing with the output object image file name and others.

FIG. 5 is a table showing one example of information stored in the first storing part 24. For example, the image obtaining instruction operation may be carried out in the remote operation device 9 having IP address of "xxx.xxx.xxx.xx1" (step S1) and the transmitting image obtaining instruction containing the image data represented by the electronic file having the electronic file name of "Image1.bmp" may be transmitted to the controlling part 10. Moreover, after the process condition setting operation is carried out in the remote operation device 9 (step S2), the output execution operation is carried out (step S7: OUTPUT EXECUTION OPERATION) and the image obtaining instruction containing the first process condition of "thickening, full color" is transmitted to the controlling part 10.

In such a case, at step S11, the storage controlling part 12 stores, as shown in FIG. 5, the output object image file name of "Image1.bmp", the image data of the output object image represented by the output object image file having the output object image file name of "Image1.bmp", the first process condition of "thickening, full color" and IP address of "xxx.xxx.xxx.xx1" as the identification information of the remote operation device 9 in the first storing part 24 with associating with each other.

Figure 6:
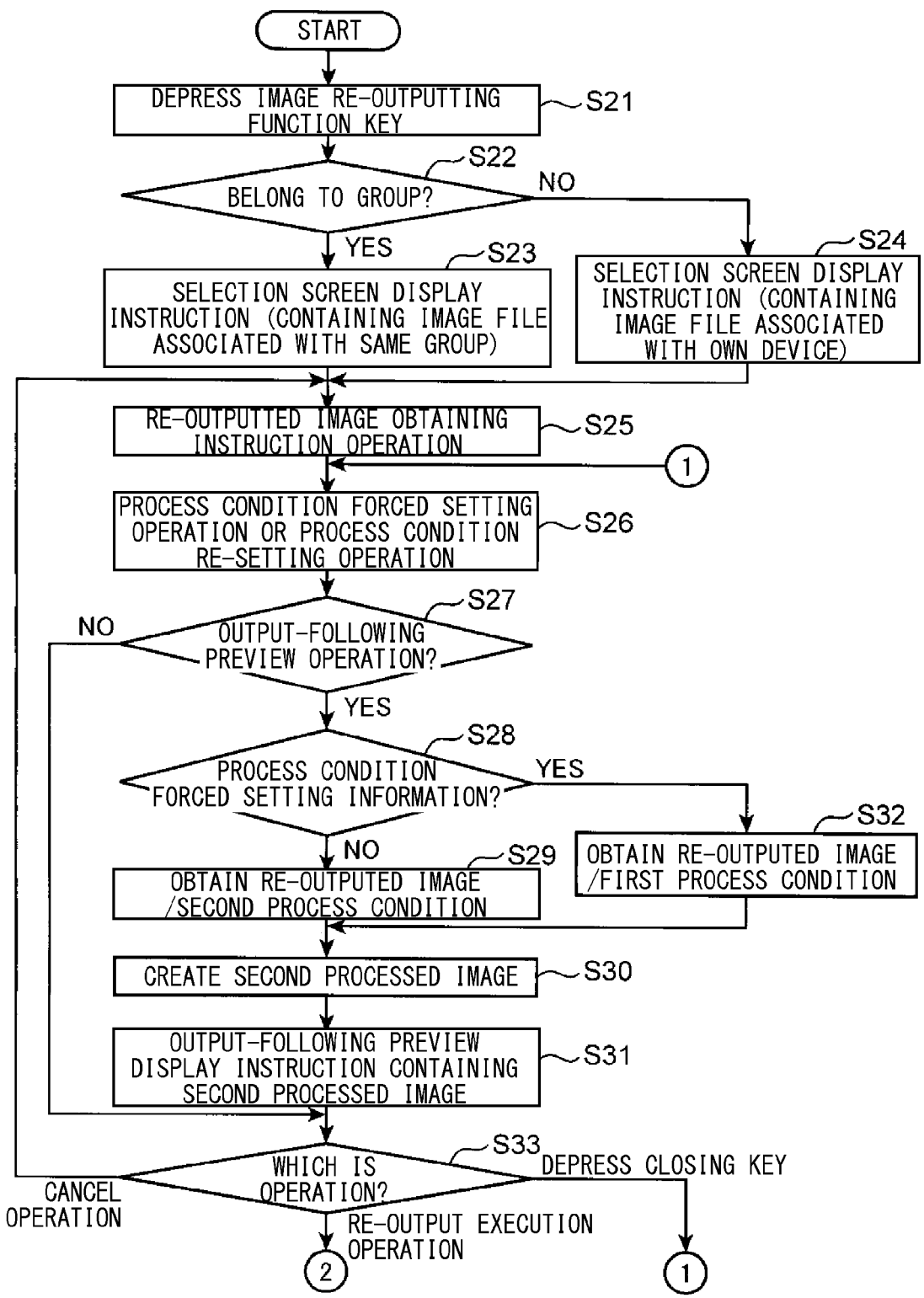
FIG. 6 is a flowchart useful for understanding the first half of action of the multifunction peripheral and the remote operation device when image re-output operation is carried out by the remote operation device.
Figure 7:
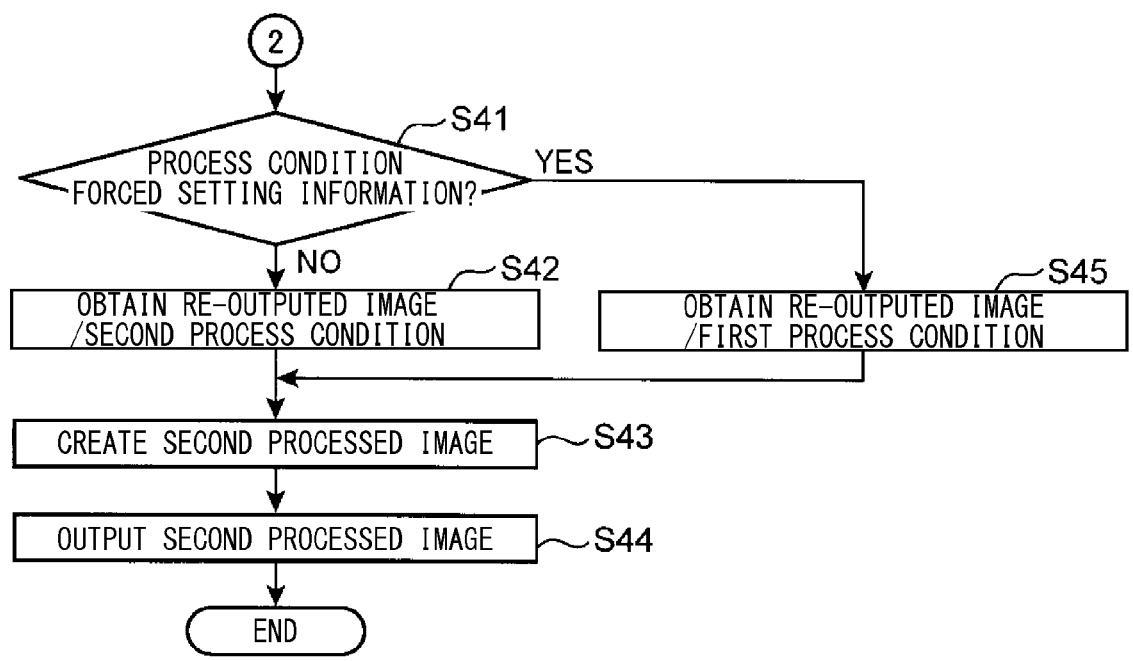
FIG. 7 is a flowchart useful for understanding the second half of action of the multifunction peripheral and the remote operation device when the image re-output operation is carried out by the remote operation device.

Next, an action of the multifunction peripheral 1 and the remote operation device 9 when image re-output operation is carried out in the remote operation device 9 will be described. The image re-output operation is operation making the multifunction peripheral 1 obtain the image data of the output object image associated with the output object image file name stored in the first storing part 24 and making the multifunction peripheral 1 process the output object image (hereinafter, so-called as a re-outputted image) represented by the image data on the first process condition stored in the first storing part 24 with being associated with the re-outputted image or on another process condition re-set by the remote operation device 9 to create the processed image and output the processed image. In this description, information stored in the second storing part 25 will be described in detail. FIGS. 6 and 7 are flowcharts useful for understanding the action of the multifunction peripheral 1 and the remote operation device 9 when image re-output operation is carried out by the remote operation device 9.

As described above, when the remote user of the remote operation device 9 touch-operates the icon displayed on the displaying part 91 for starting application software remotely operating the multifunction peripheral 1, the remote operation device 9 displays the menu screen on the displaying part 91.

Subsequently, as shown in FIG. 6, the remote user may depress the key indicating the name of the function re-outputting the image, such as a re-printing function and a re-transmitting function, displayed selectably on the menu screen (step S21).

In such a case, the remote operation device 9 transmits re-outputted image obtaining instruction containing the name of the function depressed at step S21 to the controlling part 10 via the communicating part 26. When the display controlling part 13 receives the re-outputted image obtaining instruction, the display controlling part 13 stores the name of the function contained in the display controlling part 13 in the RAM. Moreover, the display controlling part 13 obtains, as the identification information of the remote operation device 9, IP address information of transmission source of a data packet which is contained in the data packet indicating the re-outputted image obtaining instruction. Further, the display controlling part 13 decides whether or not the remote operation device 9 identified by the obtained identification information belongs to the group (step S22).

Concretely, the display controlling part 13 executes decision of step S22 by using information stored in the second storing part 25. As described above, in the second storing part 25, the identification information of the remote operation device 9 and the identification information of the group to which the remote operation device 9 belongs are stored with being associated with each other. FIG. 8 is a table showing one example of information stored in the second storing part 25.

For example, as shown in FIG. 8, the identification information of "xxx.xxx.xxx.xx1" of the remote operation device 9 and the identification information G1 of the group to which the remote operation device 9 belongs are stored with being associated with each other. Moreover, the identification information of "xxx.xxx.xxx.xx2" of the remote operation device 9 and the identification information G1 of the group to which the remote operation device 9 belongs are stored with being associated with each other. That is, two remote operation devices 9 identified by the identification information of "xxx.xxx.xxx.xx1" and the identification information of "xxx.xxx.xxx.xx2" belong to the group identified by the identification information G1.

Further, the identification information of "xxx.xxx.xxx.xx3" of the remote operation device 9 and the identification information G2 of the group to which the remote operation device 9 belongs are stored with being associated with each other. That is, the remote operation device 9 identified by the identification information of "xxx.xxx.xxx.xx3" belongs to another group identified by the identification information G2 different the group to which two remote operation devices 9 identified by the identification information of "xxx.xxx.xxx.xx1" and the identification information of "xxx.xxx.xxx.xx2" belong (the group identified by the identification information G1).

Incidentally, for example, the identification information of "xxx.xxx.xxx.xx4" of the remote operation device 9 is not stored in the second storing part 25. That is, the remote operation device 9 identified by the identification information of "xxx.xxx.xxx.xx4" does not belong to any group.

That is, the display controlling part 13 confirms at step S22 whether or not the obtained identification information the remote operation device 9 is stored in the second storing part 25 and, according to the confirmed result, decides whether or not the remote operation device 9 identified by the obtained identification information belongs to any group.

If the display controlling part 13 decides at step S22 that the remote operation device 9 belongs to the group (step S22: YES), the display controlling part 13 confirms one or more remote operation device(s) 9 belonging to the same group as the group to which the remote operation device 9 belong and obtains the output object image file name(s) associated with the identification information of the confirmed remote operation device(s) 9 and stored in the first storing part 24. Subsequently, the display controlling part 13 replies a selection screen display instruction with containing the obtained output object image file name(s) to the remote operation device 9 (step S23).

The selection screen display instruction is an instruction asking the remote operation device 9 to display re-outputted image selection screen displaying selectably the output object image file name contained in the selection screen display instruction on the displaying part 91. That is, when step S23 is executed, the remote operation device 9 displays the re-outputted image selection screen displaying selectably the output object image file name contained in the received selection screen display instruction on the displaying part 91.

On the other hand, the display controlling part 13 decides at step S22 that the remote operation device 9 does not belong to any group (step S22: NO), the display controlling part 13 obtains the output object image file name associated with the identification information of the remote operation device 9 and stored in the first storing part 24. Subsequently, the display controlling part 13 replies the selection screen display instruction with containing the obtained output object image file name to the remote operation device 9 (step S24).

That is, when step S24 is executed, the remote operation device 9 displays the re-outputted image selection screen displaying selectably the output object image file name contained in the received selection screen display instruction on the displaying part 91.

In the following, a concrete example of step S22, step S23 and step S24 will be described. For example, the identification information of the subject remote operation device 9 obtained at step S22 by the display controlling part 13 may be the identification information of "xxx.xxx.xxx.xx1" (refer to FIG. 8) of the remote operation device 9 stored in the second storing part 25. Moreover, in the first storing part 24, information as shown in FIG. 5 may be stored.

In such a case, at step S22, because the obtained identification information of "xxx.xxx.xxx.xx1" of the subject remote operation device 9 is stored in the second storing part 25, the display controlling part 13 decides that the subject remote operation device 9 belongs to the group (step S22: YES).

In such a case, at step 23, the display controlling part 13 confirms the group G1 to which the subject remote operation device 9 belong and obtains the identification information of "xxx.xxx.xxx.xx1" and "xxx.xxx.xxx.xx2" (refer to FIG. 8) of two remote operation devices 9 associated with the identification information G1 of the confirmed group and stored in the second storing part 25. Thus, the display controlling part 13 obtains the identification information of two remote operation devices 9 belonging to the group to which the subject remote operation device 9 belongs.

the display controlling part 13 obtains two output object image file names of "Image1.bmp" and "Image2.bmp" (refer to FIG. 5) associated with the obtained identification information of two remote operation devices 9 and stored in the first storing part 24. Subsequently, the display controlling part 13 replies the selection screen display instruction with containing two obtained output object image file names of "Image1.bmp" and "Image2.bmp" to the remote operation device 9.

Figure 9:
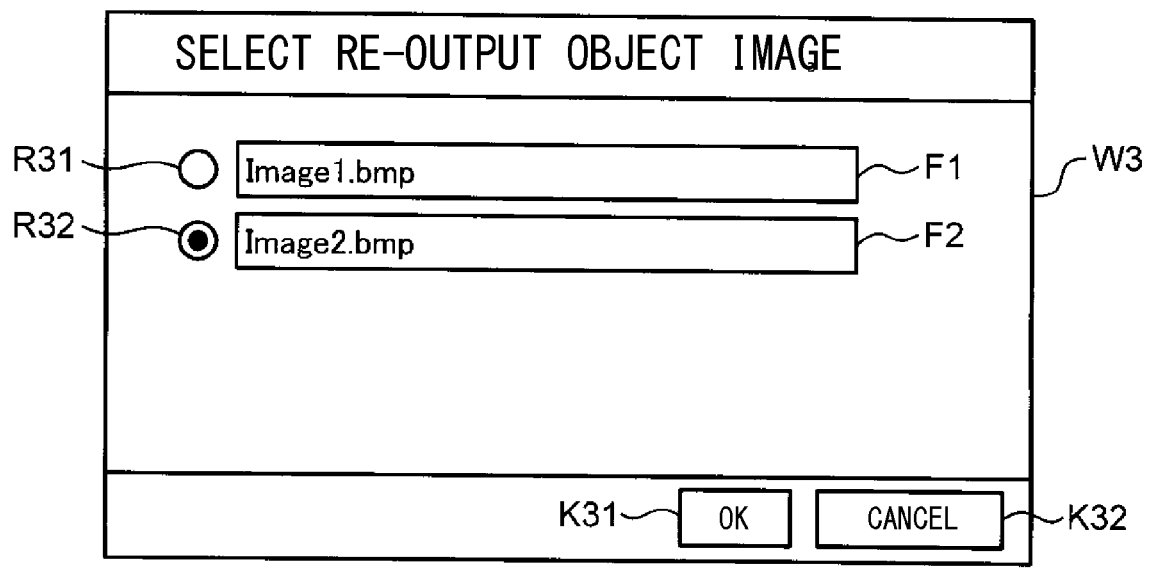
FIG. 9 is a plan view showing one example of a re-outputted image selection screen displayed on the remote operation device.

FIG. 9 is a plan view showing one example of the re-outputted image selection screen W3. When step S23 is executed, the remote operation device 9 displays, as shown in FIG. 9, the re-outputted image selection screen W3 displaying selectably two output object image file names of "Image1.bmp" and "Image2.bmp" contained in the received selection screen display instruction on the displaying part 91. Incidentally, the re-outputted image selection screen W3 will be described in detail.

On the other hand, the identification information of the subject remote operation device 9 obtained at step S22 by the display controlling part 13 may be the identification information of "xxx.xxx.xxx.xx4" not stored in the second storing part 25. Moreover, in the first storing part 24, information as shown in FIG. 5 may be stored.

In such a case, at step S22, because the obtained identification information of "xxx.xxx.xxx.xx4" of the subject remote operation device 9 is not stored in the second storing part 25, the display controlling part 13 decides that the subject remote operation device 9 does not belong to the group (step S22: NO).

Further, at step S24, the display controlling part 13 obtains the output object image file name of "Image4.bmp" (refer to FIG. 5) associated with the identification information of the remote operation device 9 obtained at step S22 and stored in the first storing part 24. Subsequently, the display controlling part 13 replies the selection screen display instruction with containing the obtained output object image file name of "Image4.bmp" to the remote operation device 9.

As a result, the remote operation device 9 displays, similarly to the re-outputted image selection screen W3 as shown in FIG. 9, the re-outputted image selection screen displaying selectably the output object image file name of "Image4.bmp" contained in the received selection screen display instruction on the displaying part 91.

With reference to FIG. 6, the remote user may carry out re-outputted image obtaining instruction operation by using the re-outputted image selection screen displayed on the displaying part 91 after step S23 and step S24 are executed (step S25).

The re-outputted image obtaining instruction operation is operation selecting the output object image file name corresponding to the output object image to be re-outputted to the multifunction peripheral 1 out of one or more output object image file name(s) displayed on the re-outputted image selection screen and transmitting the re-outputted image obtaining instruction asking the multifunction peripheral 1 to obtain the output object image corresponding to the selected output object image file name to the controlling part 10 via the communicating part 26.

In the following, the re-outputted image obtaining instruction operation at step S25 will be described in detail by using the above-mentioned re-outputted image selection screen W3 (refer to FIG. 9).

As shown in FIG. 9, on the re-outputted image selection screen W3, two radio buttons R31 and R32, file name indication columns (text labels) F1 and F2 indicating two output object image file names contained in the selection screen display instruction, an OK key K31 and a cancel Key K32 are arranged.

Two radio buttons R31 and R32 are arranged so that any one of the buttons is selectable. The radio button R31 is arranged so as to be used for selecting the output object image file name of "Image1.bmp" displayed on the file name indication column F1 adjacent to the radio button R31. Similarly, the radio button R32 is arranged so as to be used for selecting the output object image file name of "Image2.bmp" displayed on the file name indication column F2 adjacent to the radio button R32.

The OK key K31 is arranged so as to be used for carrying out operation transmitting the re-outputted image obtaining instruction asking the multifunction peripheral 1 to obtain the output object image corresponding to the output object image file name selected by operating the radio button R31 and the radio button R32 to the controlling part 10 via the communicating part 26.

For example, by touch operation of the remote user, the radio button R31 may be selected, and then, the OK key K31 may be depressed. In such a case, the remote operation device 9 transmits the re-outputted image obtaining instruction asking the multifunction peripheral 1 to obtain the output object image corresponding to the output object image file name of "Image1.bmp" indicated on the file name indication column F1 to the controlling part 10 via the communicating part 26.

The cancel key K32 is arranged, similarly to the cancel key K12 on the image obtaining instruction screen W1, so as to be used for carrying out cancel operation. That is, when the cancel key K32 is depressed, the remote operation device 9 does not display (hides) the re-outputted image selection screen W3 and re-displays the menu screen on the displaying part 91.

Thus, the re-outputted image obtaining instruction operation is carried out by operation depressing the OK Key K31 after selecting the radio button R31 or operation depressing the OK Key K31 after selecting the radio button R32.

With reference to FIG. 6, when the re-outputted image obtaining instruction operation using the re-outputted image selection screen W3 is carried out by the remote user (step S25), the remote operation device 9 displays an image re-output operation screen on the displaying part 91 after transmitting the re-outputted image obtaining instruction.

The image re-output operation screen is configured so as to be capable of process condition forced setting operation and process condition re-setting operation. The process condition forced setting operation is operation storing process condition forced setting information in the storage (not shown) in the remote operation device 9. The process condition forced setting information is information forcedly setting a process condition when making the multifunction peripheral 1 re-output the re-outputted image as the first process condition stored in the first storing part 24 with being associated with the re-outputted image. The process condition re-setting operation is operation re-setting the process condition when making the multifunction peripheral 1 output the re-outputted image.

Incidentally, in the following description, in order to simplify the description, a case where the process condition contains two conditions of the concentration adjustment condition and the color designation condition may be considered.

Figure 10:
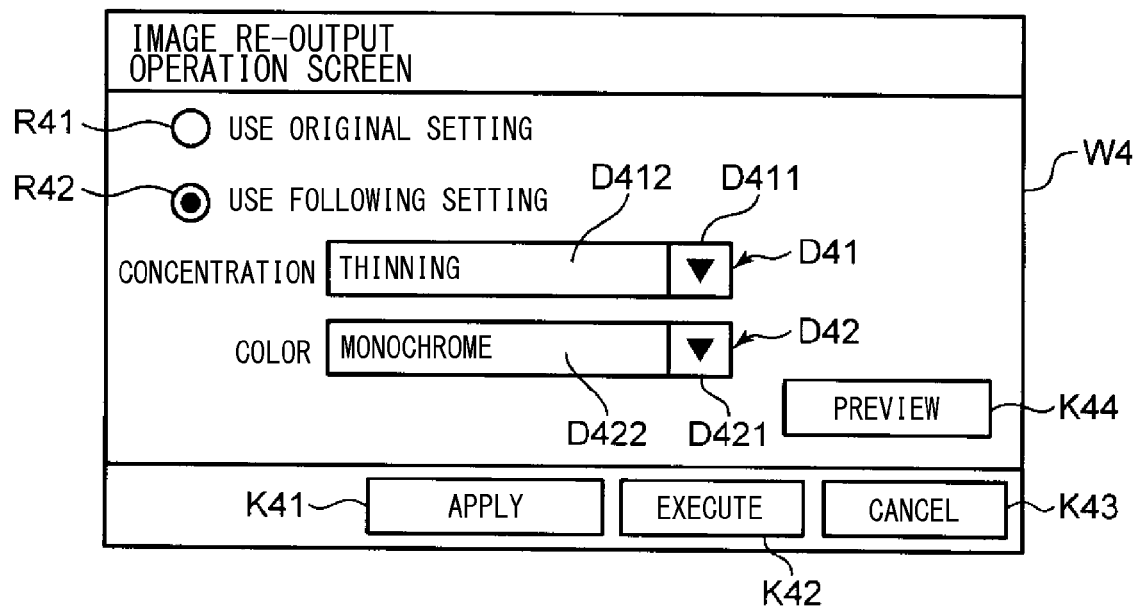
FIG. 10 is a plan view showing one example of an image re-output operation screen displayed on the remote operation device.

FIG. 10 is a plan view showing one example of the image re-output operation screen W4. For example, as shown in FIG. 10, in the image re-output operation screen W4, two radio buttons R41 and R42, two dropdown lists D41 and D42, an applying key K41, an executing key K42, a cancel key K43 and a preview key K44 are arranged.

Two radio buttons R41 and R42 are arranged so that any one of the buttons is selectable. The radio button R41 is arranged so as to disable operation of two dropdown lists D41 and D42 and the applying key K41 by the remote user and to be used for carrying out the above-mentioned process condition forced setting operation.

That is, when the remote user selects the radio button R41, operation of two dropdown lists D41 and D42 and the applying key K41 is disabled. Moreover, when the remote user selects the radio button R41, the above-mentioned process condition forced setting operation is carried out and the process condition forced setting information is stored in the storage (not shown) in the remote operation device 9.

The radio button R42 is arranged so as to enable operation of two dropdown lists D41 and D42 and the applying key K41 by the remote user and to delete the process condition forced setting information stored in the storage (not shown). That is, when the remote user selects the radio button R42, operation of two dropdown lists D41 and D42 and the applying key K41 is enabled. Moreover, when the remote user selects the radio button R42, the remote operation device 9 deletes the process condition forced setting information stored in the storage (not shown).

The dropdown list D41 is arranged, similarly to the dropdown list D21 on the image output operation screen W2, so as to be used for re-setting the concentration adjustment condition when outputting the re-outputted image. Concretely, if a right side key D411 of the dropdown list D41 is touch-operated, a plurality of candidate values (e.g. "thickening", "normal", "thinning" and others) settable as the concentration adjustment condition are displayed selectably. Subsequently, if any one of the displayed plurality of candidate values is selected, the selected candidate value is inputted into an input column D412. Thereby, the concentration adjustment condition when outputting the re-outputted image is re-set to the selected candidate value. For example, in a concrete example shown in FIG. 10, the concentration adjustment condition is re-set to a condition of "thinning".

Incidentally, just after re-outputted image obtaining operation is carried out (step S25), when displaying the image re-output operation screen W4 on the displaying part 91, if the radio button R42 is firstly selected, the remote operation device 9 inputs the concentration adjustment condition stored in the storage (not shown) of the remote operation device 9 into the input column D412. That is, at the beginning of displaying of the image re-output operation screen W4, if the radio button R42 is firstly selected, the concentration adjustment condition is re-set to the preceding concentration adjustment condition stored in the storage (not shown).

The dropdown list D42 is arranged, similarly to the dropdown list D22 on the image output operation screen W2, so as to be used for re-setting the color designating condition when outputting the re-outputted image. Concretely, if a right side key D421 of the dropdown list D42 is touch-operated, a plurality of candidate values (e.g. "full color", "gray scale", "monochrome" and others) settable as the color designating condition are displayed selectably. Subsequently, if any one of the displayed plurality of candidate values is selected, the selected candidate value is inputted into an input column D422 of the color designating condition. Thereby, the color designating condition when outputting the re-outputted image is re-set to the selected candidate value. For example, in a concrete example shown in FIG. 10, the color designating condition is re-set to a condition of "monochrome".

Incidentally, just after the re-outputted image obtaining operation is carried out (step S25), when displaying the image re-output operation screen W4 on the displaying part 91, if the radio button R42 is firstly selected, the remote operation device 9 inputs the color designating condition stored in the storage (not shown) of the remote operation device 9 into the input column D422. That is, at the beginning of displaying of the image re-output operation screen W4, if the radio button R42 is firstly selected, the color designating condition is re-set to the preceding color designating condition stored in the storage (not shown).

Thus, the process condition re-setting operation is carried out by selection of the radio button R42 and operation of the dropdown list D41 and the dropdown list D42. Alternatively, the process condition re-setting operation is carried out by firstly selecting the radio button R42 and by not changing (leaving alone) the preceding process condition peculiar to the remote operation device 9 stored in the storage (not shown) of the remote operation device 9 inputted in the input columns D412 and D422 at the beginning of displaying of the image re-output operation screen W4 without operating the dropdown list D41 and the dropdown list D42.

In the following, the process condition set in the process condition re-setting operation (in the concrete example, the concentration condition and the color designating condition) is so-called as a second process condition.

The applying key K41 is arranged, similarly to the applying key K21 on the image output operation screen W2, so as to be used for updating the preceding process condition stored in the storage (not shown). Concretely, if the applying key K41 is depressed, the remote operation device 9 updates the preceding concentration adjustment condition and the preceding color designating condition stored in the storage (not shown) by the concentration adjustment condition inputted into the input column D412 and the color designating condition inputted into the input column D422. Thus, in the storage (not shown) of the remote operation device 9, the process condition peculiar to the remote operation device 9 is stored.

The executing key K42 is arranged so as to be used for carrying out re-output execution operation. The re-output execution operation is operation transmitting re-output execution instruction to the controlling part 10 via the communicating part 26. The re-output execution instruction is an instruction asking the multifunction peripheral 1 to process the re-outputted image on the first process condition stored in the storing part 24 with being associated with the re-outputted image or to process the re-outputted image on the second process condition set by the process condition re-setting operation to create the processed image and asking the multifunction peripheral 1 to output the processed image as a second processed image.

Concretely, after the process condition forced setting operation is carried out to select the radio button R41, if the executing key K42 is depressed, the remote operation device 9 transmits the re-output execution instruction containing the process condition forced setting information stored in the storage (not shown) to the controlling part 10 via the communicating part 26. On the other hand, after the process condition re-setting operation is carried out, if the executing key K42 is depressed, the remote operation device 9 transmits the re-output execution instruction containing the second process condition set by the process condition re-setting operation to the controlling part 10 via the communicating part 26.

The cancel key K43 is arranged, similarly to the cancel key K12 of the image obtaining instruction screen W1, so as to be used for carrying out cancel operation. That is, if the cancel key K43 is depressed, the remote operation device 9 does not display (hides) the image re-output operation screen W4 and re-displays the re-outputted image selection screen W3 on the displaying part 91.

The preview key K44 is arranged so as to be used for carrying out output-following preview operation (preview operation). The output-following preview operation is operation transmitting an output-following preview execution instruction to the controlling part 10 via the communicating part 26. The output-following preview execution instruction is an instruction asking the multifunction peripheral 1 to process the re-outputted image on the first process condition stored in the storing part 24 with being associated with the re-outputted image or to process the re-outputted image on the second process condition to create the processed image and asking the multifunction peripheral 1 to reply an output-following preview display instruction containing the processed image as a second processed image. The output-following preview display instruction is an instruction asking the remote operation device 9 to display the second processed image contained in the output-following preview display instruction on the displaying part 91.

That is, after the process condition forced setting operation is carried out to select the radio button R41, if the preview key K44 is depressed, the remote operation device 9 transmits the output-following preview execution instruction containing the process condition forced setting information stored in the storage (not shown) to the controlling part 10 via the communicating part 26. On the other hand, after the process condition re-setting operation is carried out, if the preview key K44 is depressed, the remote operation device 9 transmits the output-following preview execution instruction containing the second process condition set by the process condition re-setting operation to the controlling part 10 via the communicating part 26. As a result, when the output-following preview display instruction containing the second processed image is replied to the remote operation device 9, the remote operation device 9 displays the second processed image on the displaying part 91.

Incidentally, on the image re-output operation screen W4, a dropdown list (not shown) used for re-setting the output condition, such as the print condition and the transmission condition, when outputting the re-outputted image is arranged. The dropdown list is configured so as to be operatable while the radio button R41 is selected. That is, the output condition, such as the print condition and the transmission condition, is re-set by operation of the dropdown list. When depressing the executing key K42, the remote operation device 9 replies the above-mentioned re-output execution instruction with containing the output condition, such as the print condition and the transmission condition, set by operation of the dropdown list to the controlling part 10 via the communicating part 26.

With reference to FIG. 6, a case where the image re-output operation screen W4 is displayed on the displaying part 91 and the process condition forced setting operation or the process condition re-setting operation is carried out by the remote user may be considered (step S26). Further, the output-following preview operation may be carried out by the remote user (step S27: YES).

In such a case, the display controlling part 13 decides whether or not the process condition forced setting information is contained in the output-following preview execution instruction received when the output-following preview operation is carried out at step S27 (step S28).

If the display controlling part 13 decides that the process condition forced setting information is not contained in the output-following preview execution instruction (step S28: NO), the display controlling part 13 obtains the re-outputted image in accordance with the re-outputted image obtaining instruction received when the re-outputted image obtaining instruction operation is carried out at step S25. Concretely, the display controlling part 13 obtains the image data of the output object image stored in the first storing part 24 with being associated with the output object image file name (e.g. "Image1.bmp") indicated by the re-outputted image obtaining instruction and obtains the image presented by the obtained image data as the re-outputted image. Moreover, the display controlling part 13 obtains the second process condition contained in the output-following preview execution instruction received when the output-following preview operation is carried out at step S27 (step S29).

On the other hand, if the display controlling part 13 decides that the process condition forced setting information is contained in the output-following preview execution instruction (step S28:YES), similarly to step S29, the display controlling part 13 obtains the re-outputted image in accordance with the re-outputted image obtaining instruction received when the re-outputted image obtaining instruction operation is carried out at step S25. Moreover, the display controlling part 13 obtains the first process condition (e.g. "thickening, full color") stored in the first storing part 24 with being associated with the output object image file name (e.g. "Image1.bmp") indicated by the re-outputted image obtaining instruction (step S32).

Subsequently, the display controlling part 13 processes the re-outputted image obtained at step S29 on the second process condition obtained at step S29 to create the processed image as the second processed image. Alternatively, the display controlling part 13 processes the re-outputted image obtained at step S32 on the first process condition obtained at step S32 to create the processed image as the second processed image (step S30).

Further, the display controlling part 13 replies the output-following preview display instruction containing the image data representing the second processed image created at step S30 in accordance with the output-following preview execution instruction received when the output-following preview operation is carried out at step S27 (step S31).

When the remote operation device 9 receives the output-following preview display instruction, the remote operation device 9 displays the second processed image represented by the image data contained in the output-following preview display instruction on the displaying part 91 so as to overlap the second processed image on the image re-output operation screen W4. Incidentally, the remote operation device 9 display a closing key used for not displaying (hiding) the second processed image when displaying the second processed image on the displaying part 91.

Then, as a result of visually recognizing the second processed image displayed on the displaying part 91 by the remote user, the remote user may decide that a re-output image is not processed intendedly and may depress the closing key displayed together with the second processed image (step S33: DEPRESS CLOSING KEY). In such a case, the action is returned to step S26 and the process condition forced setting operation or the process condition re-setting operation using the image re-output operation screen W4 is carried out by the remote user.

On the other hand, as a result of visually recognizing the second processed image displayed on the displaying part 91 by the remote user, the remote user may decide that the re-output image is not processed intendedly and may depress the cancel key K43 to carry out the cancel operation (step S33: CANCEL OPERATION). In such a case, the remote operation device 9 does not display (hides) the image re-output operation screen W4 and re-displays the re-outputted image selection screen W3 on the displaying part 91. That is, the action is returned to step S25 and the re-outputted image obtaining instruction operation using the re-outputted image selection screen W3 is carried out by the remote user.

Further, as a result of visually recognizing the second processed image displayed on the displaying part 91 by the remote user, the remote user may decide that the re-outputted image is processed intendedly and may depress the execution key K42 to carry out the re-output execution operation (step S33: RE-OUTPUT EXECUTION OPERATION). Alternatively, the remote user may not carry out the output-following preview operation onto the image re-output operation screen W4 (step S27: NO) and may depress the execution key K42 to carry out the re-output execution operation (step S33: RE-OUTPUT EXECUTION OPERATION).

In these cases, as shown in FIG. 7, the image outputting part 11 decides, similarly to step S28, whether or not the process condition forced setting information is contained in the re-output execution instruction received when the re-output execution operation is carried out at step S33 (step S41).

If the image outputting part 11 decides that the process condition forced setting information is not contained in the re-output execution instruction (step S41: NO), similarly to step S29, the image outputting part 11 obtains the re-outputted image in accordance with the re-outputted image obtaining instruction received when the re-outputted image obtaining instruction operation is carried out at step S25. Moreover, the image outputting part 11 obtains the second process condition contained in the re-output execution instruction received when the re-output execution operation is carried out at step S33 (step S42).

On the other hand, if the image outputting part 11 decides that the process condition forced setting information is contained in the re-output execution instruction (step S41: YES), similarly to step S29, the image outputting part 11 obtains the re-outputted image in accordance with the re-outputted image obtaining instruction received when the re-outputted image obtaining instruction operation is carried out at step S25. Moreover, the image outputting part 11 obtains the first process condition (e.g. "thickening, full color") stored in the first storing part 24 with being associated with the output object image file name (e.g. "Image1.bmp") indicated by the re-outputted image obtaining instruction (step S45).

Subsequently, the image outputting part 11 processes the re-outputted image obtained at step S42 on the second process condition obtained at step S42 to create the processed image as the second processed image. Alternatively, the image outputting part 11 processes the re-outputted image obtained at step S45 on the first process condition obtained at step S45 to create the processed image as the second processed image (step S43).

Further, the image outputting part 11 outputs the second processed image (step S44).

Concretely, a case where the name of the function stored in the RAM and touch-operated on the menu screen by the remote user indicates the re-printing function may be considered. In this case, at step S44, the image outputting part 11 obtains the print condition contained in the re-output execution instruction received when the re-output execution operation is carried out at step S33. Moreover, the image outputting part 11 controls the image forming part 22 to form the second processed image on the sheet by using the obtained print condition.

Alternatively, a case where the name of the function stored in the RAM indicates the re-transmitting function may be considered. In this case, at step S44, the image outputting part 11 obtains the transmission condition contained in the re-output execution instruction received when the re-output execution operation is carried out at step S33. Moreover, the image outputting part 11 creates the electronic file based on the image data representing the second processed image and transmits the electronic file to the destination designated by the obtained transmission condition.

That is, when a first remote operation device 9 out of the plurality of remote operation devices 9 carries out an image output operation making the multifunction peripheral 1 process the output object image obtained in the multifunction peripheral 1 on the first process condition set by the first remote operation device 9 to create the processed image as the first processed image and output the first processed image (step S1, step S2 and step S7: OUTPUT EXECUTION OPERATION), the storage controlling part 12 stores the output object image in the first storing part 24 with associating with the first process condition (step S8 and step S11).

When a second remote operation device 9 out of the plurality of remote operation devices 9 carries out the output-following preview operation displaying the output object image stored in the first storing part 24 (steps S21-S26 and step S27: YES), the display controlling part 13 processes the output object image on the second process condition set peculiar to the second remote operation device 9 to create the second processed image and makes the second remote operation device 9 display the second processed image on the displaying part 91 (step S28: NO, and steps S29-S31).

Therefore, the user of the second remote operation device 9 can visually recognize the second processed image processed on the second process condition set peculiar to the second remote operation device 9 different from the first process condition set by the first remote operation device 9. Thereby, the user of the second remote operation device 9 can set intendedly the second process condition in the second remote operation device 9 used by the user himself or herself, and accordingly, can re-process and re-use intendedly the first processed image outputted from the multifunction peripheral 1 by the user of the first remote operation device 9.

Thus, in accordance with the configuration of the embodiment, it is possible to re-process the first processed image outputted from the multifunction peripheral 1 by the first remote operation device 9 on the second process condition set by the second remote operation device 9 to create the second processed image and to re-use the second processed image in the second remote operation device 9.

Moreover, the display controlling part 13 allows the second remote operation device 9 to display the second processed image when the identification information of the second remote operation device 9 is stored in the second storing part 25 with being associated with the same group as the first remote operation device 9 carried out the image output operation processing the output object image on the first process condition to create the first processed image and outputting the first processed image from the multifunction peripheral 1 (step S22: YES, step S23, step S25, step S26, step S27: YES, and steps S28-S31).

Therefore, it is possible to reduce a possibility that the second processed image created by re-processing the first processed image outputted the first remote operation device 9 is visually recognized in another remote operation device 9 belonging to another group different from the first remote operation device 9 and in another remote operation device 9 not belonging to any group. Thereby, it is possible to reduce a possibility that information acquired by visually recognizing the first processed image is leaked to another user of another remote operation device 9 belonging to another group and another user of another remote operation device 9 not belonging to any group.

Further, the displaying controlling part 13 processes the re-outputted image on the first process condition stored in the first storing part 24 with being associated with the re-outputted image to create the second processed image and makes the second remote operation device 9 display the second processed image on the displaying part 91 (step S32, step S30 and step S31), in a case where the process condition forced setting operation is carried out and the output-following preview operation is carried out in the second remote operation device 9, i.e. in a case where the output-following preview operation displaying the re-outputted image without using the second process condition is carried out (step S27:YES and step S28:YES).

Therefore, the user of the second remote operation device 9 can visually recognize, by carrying out the process condition forced setting operation and the output-following preview operation, the same image as the first processed image without consuming time and labor making the second remote operation device 9 re-set the same process condition as the first process condition set the first remote operation device 9.

Furthermore, the image outputting part 11 outputs the second processed image (steps S41-S45), in a case where the output-following preview operation is carried out and the re-output execution operation making the multifunction peripheral 1 re-output the second processed image displayed on the displaying part 91 by the display controlling part 13 is carried out (steps S21-S32 step S33: RE-OUTPUT EXECUTION OPERATION).

Therefore, the user of the second remote operation device 9 can make, by carrying out the re-output execution operation when visually recognizing the second processed image and deciding that intended process is completed, the multifunction peripheral 1 output the second processed image processed intendedly.

Incidentally, the above-described embodiment is an example of an embodiment according to the present disclosure, but does not restrict the disclosure to the above-described embodiment. For example, the disclosure may be actualized in improved embodiments mentioned later.

For example, in one improved embodiment, the image re-output operation screen W4 may be configured without arranging the execution key K42 and the re-output execution operation may not be carried out in the remote operation device 9. According to this, steps S41-S45 may be omitted.

In another improved embodiment, the image re-output operation screen W4 may be configured without arranging the radio button R41 and the process condition forced setting operation may not be carried out in the remote operation device 9. According to this, step S28, step S32, step S41 and step S45 may be omitted.

In a further improved embodiment, the display controlling part 13 may make all the remote operation device 9 preview the output object image stored in the first storing part 24. That is, the multifunction peripheral 1 may be simplified without arranging the second storing part 25. Moreover, the display controlling part 13 may reply the selection screen display instruction containing all the output object image file names stored in the first storing part 24 in place of steps S22-S24, in a case where the key indicating the name of the function re-outputting the image displayed selectably on the menu screen is depressed (step S21).

While the present disclosure has been described with reference to the preferable embodiment of the image forming apparatus of the disclosure and the description has technical preferable illustration, the disclosure is not to be restricted by the embodiment and illustration. Components in the embodiment of the present disclosure may be suitably changed or modified, or variously combined with other components. The claims are not restricted by the description of the embodiment.

What is claimed is:

1. An image processing apparatus operated by a plurality of remote operation devices, comprising:
    a first storing part;
    a controlling part; and
    a second storing part,
    wherein the controlling part works as:
    a storage controlling part, when an image output operation with respect to an output object image is carried out in a first remote operation device out of the plurality of remote operation devices and the first remote operation device responds to the image output operation by instructing the image processing apparatus to obtain an output object image, to set a first process condition, to process the output object image on the basis of the first process condition to create a first processed image and to output the first processed image to the first remote operation device, associating the output object image with the first process condition and storing the output object image in the first storing part; and
    a display controlling part, when a preview operation with respect to the output object image stored in the first storing part is carried out in a second remote operation device out of the plurality of remote operation devices and the second remote operation device responds to the preview operation by transmitting a preview execution instruction with respect to the output object image to the image processing apparatus and setting a second process condition peculiar to the second remote operation device, processing the output object image on the basis of the second process condition to create a second processed image and instructing the second remote operation device to display the second processed image on a displaying part of the second remote operation device,
    the second storing part stores identification information of the second remote operation device and identification information of the group to which the second remote operation device with associating with each other,
    the display controlling part allows the second remote operation device to display the second processed image when the identification information of the second remote operation device is stored in the second storing part with being associated with the same group as the first remote operation device.

2. The image processing apparatus according to claim 1, wherein
    the controlling part works as:
    an image outputting part, in a case where the preview operation is carried out and a re-output execution operation making the image processing apparatus output the second processed image displayed on the displaying part by the display controlling part is carried out, outputting the second processed image.

3. An image processing apparatus operated by a plurality of remote operation devices, comprising:
    a first storing part; and
    a controlling part,
    wherein the controlling part works as:
    a storage controlling part, when an image output operation with respect to an output object image is carried out in a first remote operation device out of the plurality of remote operation devices and the first remote operation device responds to the image output operation by instructing the image processing apparatus to obtain an output object image, to set a first process condition, to process the output object image on the basis of the first process condition to create a first processed image and to output the first processed image to the first remote operation device, associating the output object image with the first process condition and storing the output object image in the first storing part; and
    a display controlling part, when a preview operation with respect to the output object image stored in the first storing part is carried out in a second remote operation device out of the plurality of remote operation devices and the second remote operation device responds to the preview operation by transmitting a preview execution instruction with respect to the output object image to the image processing apparatus and setting a second process condition peculiar to the second remote operation device, processing the output object image on the basis of the second process condition to create a second processed image and instructing the second remote operation device to display the second processed image on a displaying part of the second remote operation device,
    the displaying controlling part processes the output object image on the first process condition stored in the first storing part with being associated with the output object image to create the second processed image and makes the second remote operation device display the second processed image on the displaying part, in a case where the preview operation displaying the output object image without using the second process condition is carried out.

4. The image processing apparatus according to claim 3, wherein
    the controlling part works as:
    an image outputting part, in a case where the preview operation is carried out and a re-output execution operation making the image processing apparatus output the second processed image displayed on the displaying part by the display controlling part is carried out, outputting the second processed image.

5. A remote operation system comprising:
    a plurality of remote operation devices; and
    an image processing apparatus operated by the remote operation device,
    wherein the image processing apparatus includes:
    a first storing part; and
    a controlling part,
    the controlling part works as:
    a storage controlling part, when an image output operation with respect to an output object image is carried out in a first remote operation device out of the plurality of remote operation devices and the first remote operation device responds to the image output operation by instructing the image processing apparatus to obtain an output object image, to set a first process condition, to process the output object image on the basis of the first process condition to create a first processed image and to output the first processed image to the first remote operation device, associating the output object image with the first process condition and storing the output object image in the first storing part; and
    a display controlling part, when a preview operation with respect to the output object image stored in the first storing part is carried out in a second remote operation device out of the plurality of remote operation devices and the second remote operation device responds to the preview operation by transmitting a preview execution instruction with respect to the output object image to the image processing apparatus and setting a second process condition peculiar to the second remote operation device, processing the output object image on the second process condition to create a second processed image and instructing the second remote operation device to display the second processed image on a displaying part of the second remote operation device, the displaying controlling part processes the output object image on the first process condition stored in the first storing part with being associated with the output object image to create the second processed image and makes the second remote operation device display the second processed image on the displaying part, in a case where the preview operation displaying the output object image without using the second process condition is carried out.

* * * * *